UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

COMPOUNDS CONTAINING SILICON AND NITROGEN AND PROCESS OF PRODUCING SUCH COMPOUNDS.

1,054,901. Specification of Letters Patent. Patented Mar. 4, 1913.

No Drawing. Application filed November 23, 1909. Serial No. 529,641.

*To all whom it may concern:*

Be it known that we, CARL BOSCH, Ph. D., and ALWIN MITTASCH, Ph. D., chemists, subjects, respectively, of the King of Prussia and the King of Saxony, residing at Ludwigshafen-on-the-Rhine, Germany, have invented new and useful Improvements in Compounds Containing Silicon and Nitrogen and Processes of Producing Such Compounds, of which the following is a specification.

Our invention relates to the production of compounds containing silicon and nitrogen, and to mixtures of silicon nitrid with other nitrids.

It is known that silicon nitrid can be obtained by heating, in an electric furnace, silica ($SiO_2$) with carbon in the presence of nitrogen (see the specification of British Letters Patent No. 12,471 A. D. 1895). We have now found that if a body containing a common metal, under which term we include a metal, or a metallic compound such as, for instance, a metallic oxid, or salt, other than a noble metal or a compound thereof, be present during the reaction consequent upon heating a mixture of silica ($SiO_2$) and carbon in the presence of nitrogen gas to the practical exclusion of oxygen gas, compounds containing silicon and nitrogen can be produced in an ordinary furnace, while, if an electric furnace be employed, the reaction proceeds much more rapidly than is the case when no such metal, or metallic compound is present.

If desired, in carrying out this invention, mixtures containing silica and a metallic compound such as occur in nature can be employed. For instance, quartz containing lime, alumina, or iron oxid, or silicates, or other minerals containing sufficient silica, can be used. If coal containing metallic compounds be employed as the source of carbon, the quantity of any further metallic compound of the kind indicated may be lessened or entirely omitted in accordance with the amount of metallic compound in the coal. Either one metal, or metallic compound, or a mixture of two, or more, such bodies can be used, and instead of pure nitrogen, any suitable gases containing nitrogen can be employed. Should the metal or metallic compound present be one such for instance as aluminium, titanium, chromium, zirconium, vanadium, or a compound of any one of these, which is capable of yielding a nitrid, a mixture of this nitrid with the compound containing silicon and nitrogen will generally be obtained, although all these metals and metallic compounds do not yield nitrids with the same facility.

Suitable temperatures for carrying out the reaction of this application lie between 1200° and 2,000° C.

The following examples will serve to illustrate further the nature of our invention, which, however, is not confined to these examples. The parts are by weight.

Example 1: Mix well together seventy-five parts of finely powdered quartz, twenty-five parts of charcoal powder, and two parts of sodium carbonate, and heat the mixture for from ten, to twelve, hours in a current of nitrogen gas at a temperature of from thirteen hundred, to fourteen hundred, degrees centigrade, and allow the mass to cool slowly in the current of nitrogen. In this example, potassium carbonate, calcium carbonate, strontium carbonate, barium carbonate, magnesium carbonate, or magnesium oxid, can be employed instead of sodium carbonate.

Example 2: Mix well together seventy parts of quartz, five parts of iron powder, and twenty-five parts of soot, and heat the mixture for twelve hours in a current of nitrogen gas containing a small percentage of hydrogen gas, at a temperature of fourteen hundred degrees centigrade. In this example, instead of iron powder, iron oxid, iron carbid, chromium oxid, or nickel oxid, can be used.

Example 3: Heat together, for ten hours, in a current of nitrogen gas, at a temperature of fourteen hundred and fifty degrees centigrade, seventy parts of pure silica, two parts of manganese oxid, three parts of feldspar, and twenty-five parts of charcoal.

Example 4: Heat together, for one hour, in an electric resistance furnace, at about fifteen hundred and fifty degrees centigrade, while passing a current of nitrogen gas through the furnace, seventy-two parts of quartz, three parts of cerium oxid, two parts of calcium fluorid, and twenty-three parts of anthracite. Instead of cerium oxid in this example, use can be made of vanadium, molybdenum, lanthanum, beryllium, uranium, or tungsten, compounds, either as they occur in nature, or manufactured, and instead of calcium fluorid, calcium chlorid, or calcium sulfate, can be used.

Example 5: Mix twenty-six parts of charcoal with seventy-four parts of ground Rhine pebbles, containing eighty-five per cent. of silica, eight per cent. of iron oxid and iron sulfid, three per cent. of alumina, two per cent. of lime, and one per cent. of magnesium oxid, and heat the mixture in a current of nitrogen gas for six hours at a temperature of from fourteen hundred, to fifteen hundred, degrees centigrade.

Example 6: Heat a mixture of seventy-two parts of china clay and twenty-eight parts of soot in an electric furnace for one hour in a current of nitrogen gas at a temperature of from sixteen hundred, to eighteen hundred, degrees centigrade.

Example 7: Heat a mixture of seventy parts of finely ground granite, or fullers' clay, and thirty parts of powdered anthracite in an electric furnace in a current of nitrogen gas for two hours at a temperature of from fifteen hundred, to sixteen hundred, degrees centigrade.

In each of the foregoing examples, the product obtained contains silicon nitrid, probably of a constitution corresponding to the formula $Si_3N_4$, and in those cases in which aluminium is present a corresponding quantity of aluminium nitrid (AlN) is formed and the silicon nitrid and the aluminium nitrid may exist side by side, or a complex or double nitrid may be formed.

Now what we claim is:—

1. The process of producing compounds containing silicon and nitrogen by heating silica, carbon and a body containing a common metal in the presence of nitrogen gas, while practically excluding oxygen gas at a temperature between approximately 1300° C. and approximately 1800° C.

2. The process of producing silicon nitrid and aluminium nitrid by heating aluminium silicate with carbon in the presence of nitrogen gas, while practically excluding oxygen gas at a temperature between approximately 1300° C. and approximately 1800° C.

3. The new composition of matter containing silicon nitrid and aluminium nitrid.

In testimony whereof we have hereunto set our hands in the presence of two subscribing witnesses.

CARL BOSCH.
ALWIN MITTASCH.

Witnesses:
J. ALEC. LLOYD,
W. W. KLUNKLE.